United States Patent [19]

Liu et al.

[11] Patent Number: 4,810,474

[45] Date of Patent: Mar. 7, 1989

[54] METHOD OF REMOVING NITROGEN MONOXIDE FROM A NITROGEN MONOXIDE-CONTAINING GAS USING A WATER-SOLUBLE IRON ION-DITHIOCARBAMATE, XANTHATE OR THIOXANTHATE

[75] Inventors: David K. Liu, San Pablo; Shih-Ger Chang, El Cerrito, both of Calif.

[73] Assignee: The United States of America as represented by the United States Department of Energy, Washington, D.C.

[21] Appl. No.: 89,285

[22] Filed: Aug. 25, 1987

[51] Int. Cl.$^4$ ............................................. C01B 21/00
[52] U.S. Cl. .................................................... 423/235
[58] Field of Search ............................... 423/235–239, 423/239 A

[56] References Cited

U.S. PATENT DOCUMENTS

| | | | |
|---|---|---|---|
| 3,932,585 | 1/1976 | Moriguchi et al. | 423/235 |
| 3,984,522 | 10/1976 | Saito et al. | 423/235 |
| 4,044,101 | 8/1977 | Hisamatsu et al. | 423/235 |
| 4,079,118 | 3/1978 | Gorai | 423/235 |
| 4,081,509 | 3/1978 | Hishinuma et al. | 423/235 |
| 4,091,074 | 5/1978 | Gorai et al. | 423/235 |
| 4,126,529 | 11/1978 | DeBerry | 204/180 P |
| 4,158,044 | 6/1979 | Takabatake et al. | 423/235 |
| 4,423,158 | 12/1983 | Porath | 521/32 |
| 4,448,899 | 5/1984 | Hass | 423/239 X |
| 4,518,760 | 5/1985 | Smith et al. | 528/48 |
| 4,732,744 | 3/1988 | Chang et al. | 423/235 |

OTHER PUBLICATIONS

Tu et al, Chemistry of a Flue Gas Combined NO$_x$ and SO$_2$ Scrubber Employing Ferrous Cysteine Additives, Apr. 1986.

Primary Examiner—Gregory A. Heller
Attorney, Agent, or Firm—L. E. Carnahan; Roger S. Gaither; Judson R. Hightower

[57] ABSTRACT

A method of removing nitrogen monoxide from a nitrogen monoxide-containing gas, which method comprises:

(a) contacting a nitrogen oxide-containing gas with an aqueous solution of water soluble organic compound-iron ion chelate of the formula:

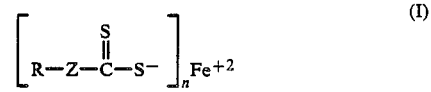

wherein the water-soluble organic compound is selected from compounds of the formula:

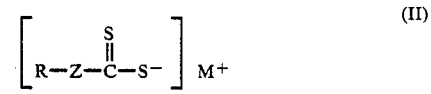

wherein:

R is selected from hydrogen or an organic moiety having at least one polar functional group;

Z is selected from oxygen, sulfur, or —N—A wherein N is nitrogen and A is hydrogen or lower alkyl having from one to four carbon atoms; and M is selected from hydrogen, sodium or potassium; and n is 1 or 2, in a contacting zone for a time and at a temperature effective to reduce the nitrogen monoxide. These mixtures are useful to provide an unexpensive method of removing NO from gases, thus reducing atmospheric pollution from flue gases.

19 Claims, 3 Drawing Sheets

LABORATORY SCALE WET FLUE GAS SCRUBBER

METHOD OF REMOVING NITROGEN MONOXIDE FROM A NITROGEN MONOXIDE-CONTAINING GAS USING A WATER-SOLUBLE IRON ION-DITHIOCARBAMATE, XANTHATE OR THIOXANTHATE

BACKGROUND OF INVENTION

Field of Invention

The U.S. Government has rights in this invention pursuant to Contract No. DE-AC03-76SF00098 awarded by the U.S. Department of Energy to the University of California.

The present invention relates to an improved method for the removal of nitrogen monoxide (NO) from a nitrogen monoxide-containing gas using dithiocarbamates, xanthates or thioxanthates.

The concern about $NO_x$ in the atmosphere, and the related problem of acid rain, has attracted considerable attention in the United States and Europe. The signs of acidification of the environment due to acid rain has become obvious in areas downwind from major sources of combustion gases, e.g., smokestacks, power plants, smelting, producing $NO_x$ and $SO_2$. Major affected areas include Northeastern United States, Southeastern Canada and in the Scandinavian countries in Europe. A major research effor is underway to reduce $NO_x$ and $SO_2$ levels from gases from combustion sources in overall cost effective manner.

A number of presently used techniques include lime/limestone wet flue gas scrubbing, which is the most widely-used process in the utility industry. This and related processes require disposal of a large amount of solid waste, e.g., calcium sulfate and calcium sulfite. Some patents of interest include, for example, U.S. Pat. Nos. 3,984,522 and 4,044,101 assigned to Asahi which disclose a process for removing NO from a gas stream using a solution containing an iron chelate and sulfur moieties.

M. Takabatake et al., in U.S. Pat. No. 4,158,044 disclose a method of removing NO from an industrial gas which involves contacting a ferrous chelate complex produced by combining ferrous iron and a chelate liquid in water having a pH of between 2 and 3. None of the ligands disclosed or suggested have a —C(=S)—S— structure, and an acidic pH of 2 or more is disclosed.

R. H. Hass in U.S. Pat. No. 4,448,899 discloses a process for the removal of NO and $SO_x$ pollutants from a flue gas by (1) absorbing $SO_2$ into an aqueous absorbant containing a formate compound, and (2) regenerating the spent absorbant. Nitrogen monoxide is removed by contacting with an aqueous absorbant containing an iron (II) chelate, such as a chelate of ferrous ion with an ethylenediaminetetraacetic acid (EDTA)-type chelate. No chelates are taught or suggested which have a —C(=S)—S— structure.

Additional U.S. Patents of interest include Nos. 4,347,227, 4,423,158, 4,079,118, 4,091,074, 3,932,585, 4,081,509, and 4,126,529.

The reaction of primary and secondary alkyl amines with carbon disulfide ($CS_2$) is known to produce water-soluble dithiocarbamates. Dialkyldithiocarbamate complexes of transition metals such as $Fe^{2+}$ and $Co^{2+}$ are reported to bind NO. (See R. L. Carlin, et al., Journal of Inorganic and Nuclear Chemistry, Vol. 26, #5, p. 898-901, 1964.) However, because of charge balances these chelate-metal complexes are air-sensitive, are not soluble in water, and are only soluble in certain organic solvents, and therefore cannot be used as additives in aqueous solutions for the absorption of nitric oxide (NO) from a flue gas mixture in which oxygen is also present.

None of these patents or references disclose the use of a water-soluble xanthate, thioxanthate or dithiocarbamate moiety as a water-soluble chelating agent-ferrous ion complex in the removal of NO from combustion gases as is described in the present invention. It is also extremely valuable to have a water-soluble organic moiety-iron chelating system which can be reused.

SUMMARY OF THE INVENTION

The present invention relates to a method of removing of nitrogen monoxide from a nitrogen monoxide-containing gas which method comprises:

(a) contacting a nitrogen oxide-containing gas with an aqueous solution of water soluble organic compound-iron ion chelate complex of the formula:

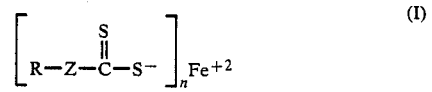

wherein the water-soluble organic compound is selected from precursor compounds of the formula:

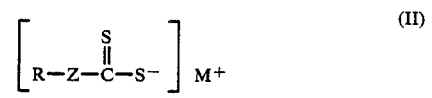

wherein:

R is selected from hydrogen or an organic moiety having at least one polar functional group;

Z is selected from oxygen, sulfur, or —N—A wherein N is nitrogen and A is hydrogen or lower alkyl having from one to four carbon atoms; and M is selected from hydrogen, sodium or potassium; and n is 1 or 2, in a contacting zone for a time and at a temperature effective to reduce the nitrogen monoxide to nitrogen.

The present invention, a series of water-soluble dithiocarbamates xanthates or thioxanthates via the reaction of $CS_2$ with HO—, HS—, $NH_2$—, and/or —NH- containing compounds, and have demonstrated that:

(i) the ferrous complexes of these dithiocarbamates, xanthates or thioxanthates are also water-soluble, and (ii) aqueous solutions containing such water-soluble complexes are effective in removing NO from a flue gas mixture also containing oxygen. A similar approach using water-soluble ferrous xanthate and thioxanthate complexes is also disclosed.

DETAILED DESCRIPTION OF THE INVENTION AND PREFERRED EMBODIMENTS

Figure 1:
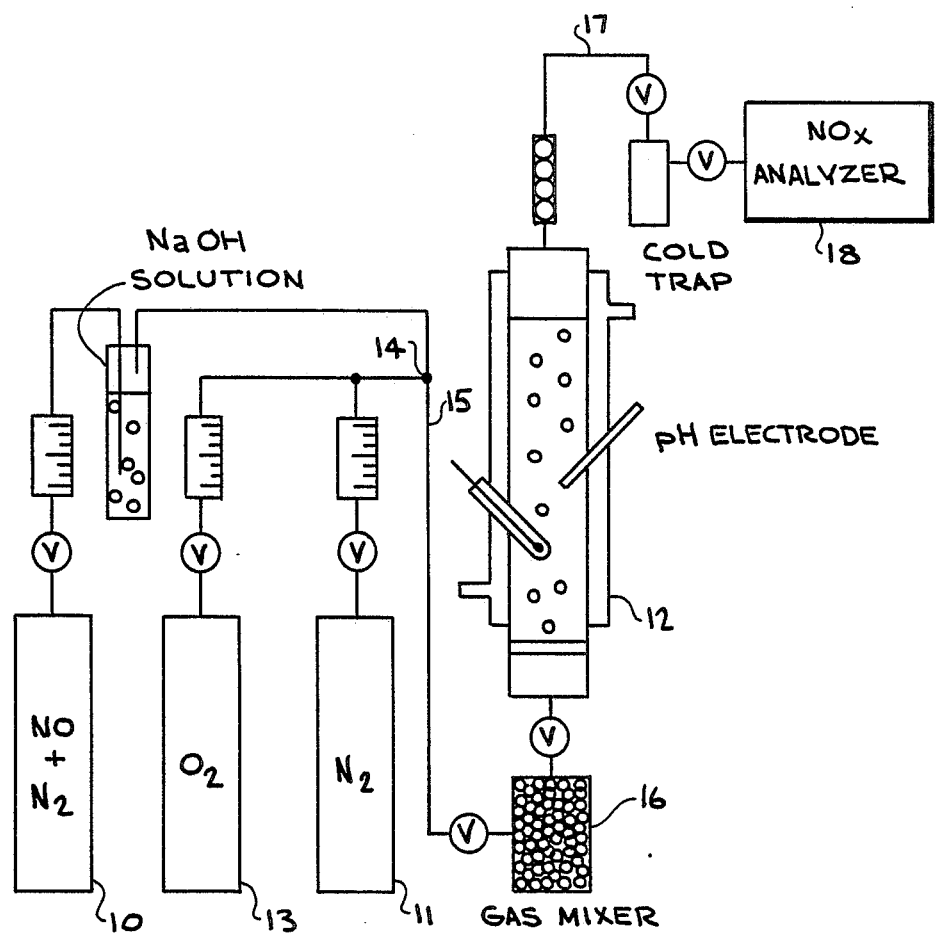
FIG. 1 is a schematic diagram of a laboratory experimental apparatus used for the removal of NO from gas containing NO.

In the present invention, the soluble dithiocarbamates (dtc) are formed by the reaction between amino groups and $CS_2$ in the presence of NaOH is shown in Equation A, using glycine as an illustration.

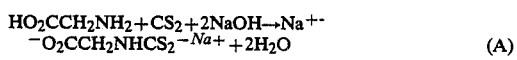

(A)

Besides glycine (Gly), other dtc's specifically examined include those starting with cysteine (CySH), reduced glutathione (GSH), iminodiacetic acid (IDA), ammonium carbamate (AC), urea, dimethylurea (DMU) and thiourea (TU). This procedure can be applied to any —$NH_2$ or —NH-containing compounds, i.e., any primary or secondary amines, amides, imides, amino acids, etc., to render the dtc and the resultant transition metal-dtc complex water-soluble. Also, any strong base can be used in place of NaOH. The reactions could be carried out at room temperature so that by-product (such as thiohydantoin) formation would not occur. Using the same concept, soluble xanthates (xan) are prepared by the reaction between an alcohol and $CS_2$ in the presence of a strong base, such as NaOH, as represented by Equation B.

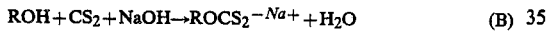

(B)

Xanthates are prepared from diethanolamine (DEA), salicyclic acid (SA) or sucrose by this method. It should be pointed out that in the case of DEA, which contains both —OH and —$NH_2$ functionalities, it is unclear whether a dtc or a xan was formed, although an xan is assumed to be produced in this invention. Again, any OH-containing compound, i.e., any primary, secondary, or tertiary alcohol, which also possesses one or more ionizable and/or polar groups which produce a water-soluble product, can be used as a starting material for this purpose. These water-soluble compounds when combined with iron (II) produce a water-soluble chelate-iron (II) complex. Similarly, water-soluble thioxanthates can be prepared via reaction between a thiol containing the one or more ionizable/polar groups and carbon disulfide in the presence of base, e.g. NaOH, KOH, mixtures thereof and the like.

The colors of the above dtc- and xan-containing solutions range from light yellow for Gly-dtc to orange-red for urea-dtc. In most cases, sulfide is formed in the reaction mixture, due to the decomposition of $CS_2$ and/or partial degradation of the dtc/xan product. Addition of the dtc/xan to $Fe^{+2}$ therefore generally results in the formation of a black precipitate, presumably FeS. Nevertheless, the resultant mixture of a ferrous salt, such as $Fe(NH_4)_2(SO_4)_2 \cdot 6H_2O$, and a dtc/xan proves to be much more effective in the absorption of NO from a simulated flue gas mixture containing NO and $O_2$, compared with using a mixture of the same ferrous salt and the dtc/xan precursor. Our results indicate that the highest NO removal efficiencies were achieved when the dtc/xan was prepared under an inert ($N_2$) atmosphere and used immediately after preparation, (within 1 hr.) due to the oxidation/decomposition of the ligand upon prolonged exposure to oxygen in the air.

Table I summarizes the results obtained from NO absorption research using $Fe^{2+}$-dtc complexes derived from $CS_2$ and $NH_2$— or NH-containing cmpounds. (The NO absorption capacity is defined as the number of moles NO absorbed per mole of $Fe^{2+}$ used and is symbolized by $nNO/nFe^{2+}$.) It is apparent from the data in Table I that an aqueous solution containing a ferrous complex of $CS_2$-derivatized IDA or glycine (Gly), i.e., $Fe^{2+}$(IDA-dtc) [Example 5] or $Fe^{2+}$(Gly-dtc) [Example 9], are more efficient in NO absorption compared with their $Fe^{2+}$ (IDA) [Example 3] or $Fe^{2+}$ (Gly) [Example 7] counterparts. The increase in NO removal efficiency is clearly not due to FeS formation [Example 2]. Results of the pH-dependence studies establish that both $Fe^{2+}$ (IDA-dtc) and $Fe^{2+}$(Gly-dtc) are most effective at pH~7. The use of $Fe^{3+}$ instead of $Fe^{2+}$ in the case of Gly-dtc [Example 10] results in a slight decrease in NO absorption efficiency. In the case of CySH-dtc [Example 14] and GSH-dtc [Examples 16 and 17], the $nNO/nFe^{2+}$ ratios are very close to those for CySH [Example 13] and GSH [Example 15], respectively, suggesting that the —C(=S)—S— groups in CySH-dtc and GSH-dtc are not directly involved in the chelation to $Fe^{2+}$.

Urea and several of its derivatives are also functionalized by reaction with $CS_2$. The resultant ferrous complex of urea-dtc is much more effective in absorbing NO compared with ferrous-urea alone. For instance, at pH 10.0, $nNO/Fe^{2+}=0.01$ for $Fe^{2+}$ (urea) [Example 18], whereas $nNO/nFe^{2+}=0.28$ and 0.23 for $Fe^{2+}$ (urea-dtc) in the presence of 0% [Example 19] and 4% $O_2$ [Example 21], respectively. Unlike $Fe^{2+}$ (IDA-dtc) and $Fe^{2+}$ (Gly-dtc), $Fe^{2+}$ (urea-dtc) is most efficient between pH 9 and 10. The addition of more urea-dtc ligand to a system which has ceased to absorb NO results in reactivation of the system, and the $nNO/nFe^{2+}$ ratio was actually higher during the second cycle [Example 22]. Ferrous complexes of several derivatives of urea including ammonium carbamate, dimethylurea and thiourea [Examples 25–31] are also capable of absorbing NO in the presence of $O_2$.

Soluble ferrous xanthate complexes derived from the reaction between —OH-containing compounds and $CS_2$ were also tested for their ability to absorb NO, and the results are shown in Table II. It was found that $Fe^{2+}$ (DEA-xan) is much more effective in NO removal compared to $Fe^{2+}$ (DEA) alone. For instance, at pH 7.0, $nNO/nFe^{2+}=0.02$ for $Fe^{2+}$ (DEA) [Example 32], whereas $nNO/nFe^{2+}=0.73$ and 0.33 for $Fe^{2+}$ (DEA-xan) in the presence of 0% [Example 34] and 4% $O_2$ [Example 37], respectively. The NO absorption efficiency for $Fe^{2+}$ (DEA-xan) is highest at pH about 7. Ferrous xanthates derived from salicylic acids [Example 40] and sucrose [Example 42] are also capable of absorbing NO at higher efficiencies compared with $Fe^{2+}$ (SA) [Example 39] and $Fe^{2+}$ (sucrose) [Example 41], respectively.

Figure 2:
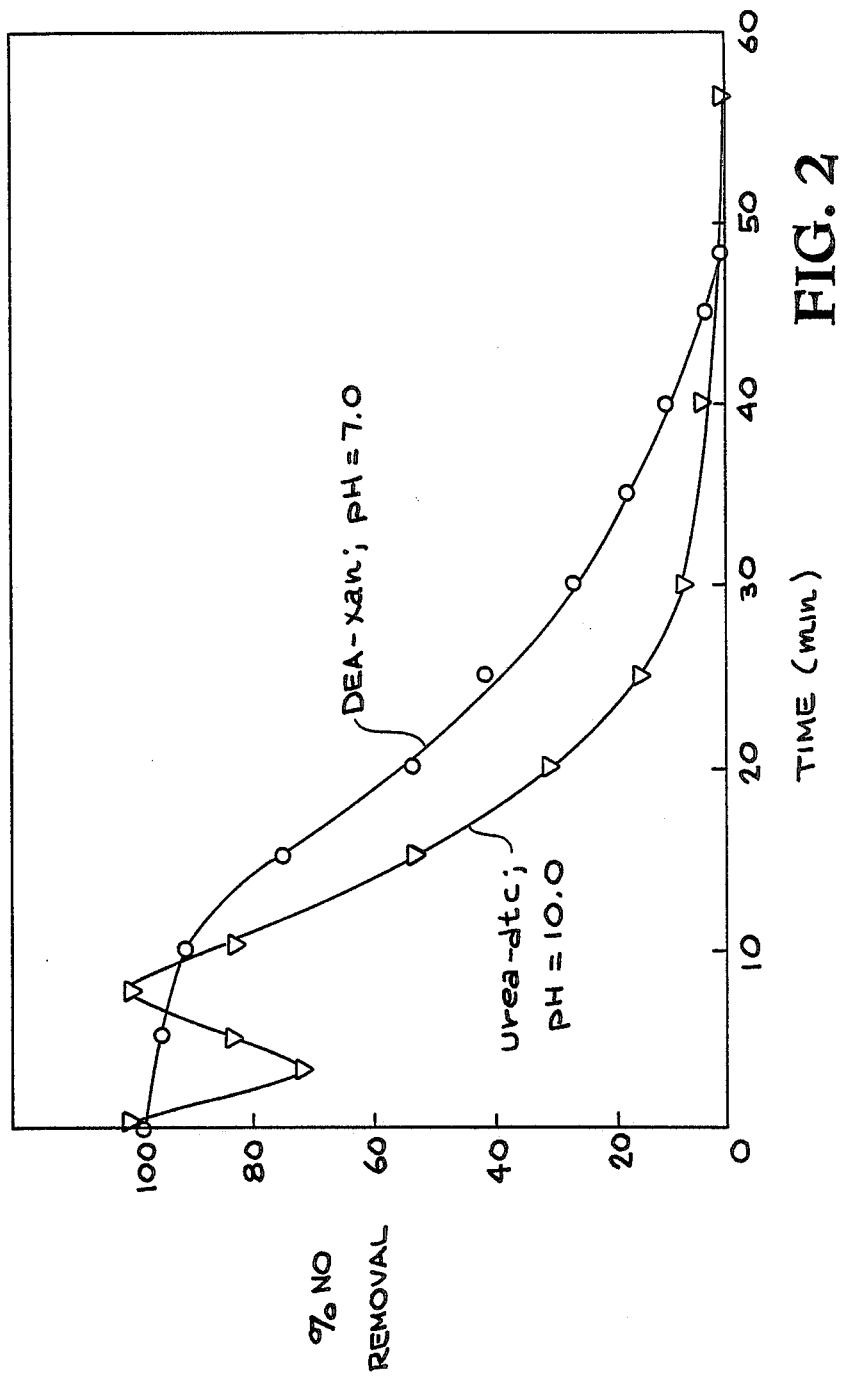
FIG. 2 is a diagram of the NO absorption efficiency of ferrous urea-dithiocarbamate (urea-dtc) and ferrous diethanolamine-xanthate (DEA-xan) as a function of time. The percentage of NO removal is on the vertical axis and absorption time is on the horizontal axis.

The NO absorption efficiency of ferrous urea-dtc and ferrous DEA-xan as a function of reaction time is shown in FIG. 2. The data is extracted from Examples 21 and 37 for urea-dtc and DEA-xan, respectively. Whereas the NO removal efficiency of ferrous DEA-xan decreases monotonously with time, the efficiency for ferrous urea-dtc decreases slightly initially and then increases to 100% before decreasing monotonously again.

Figure 3:
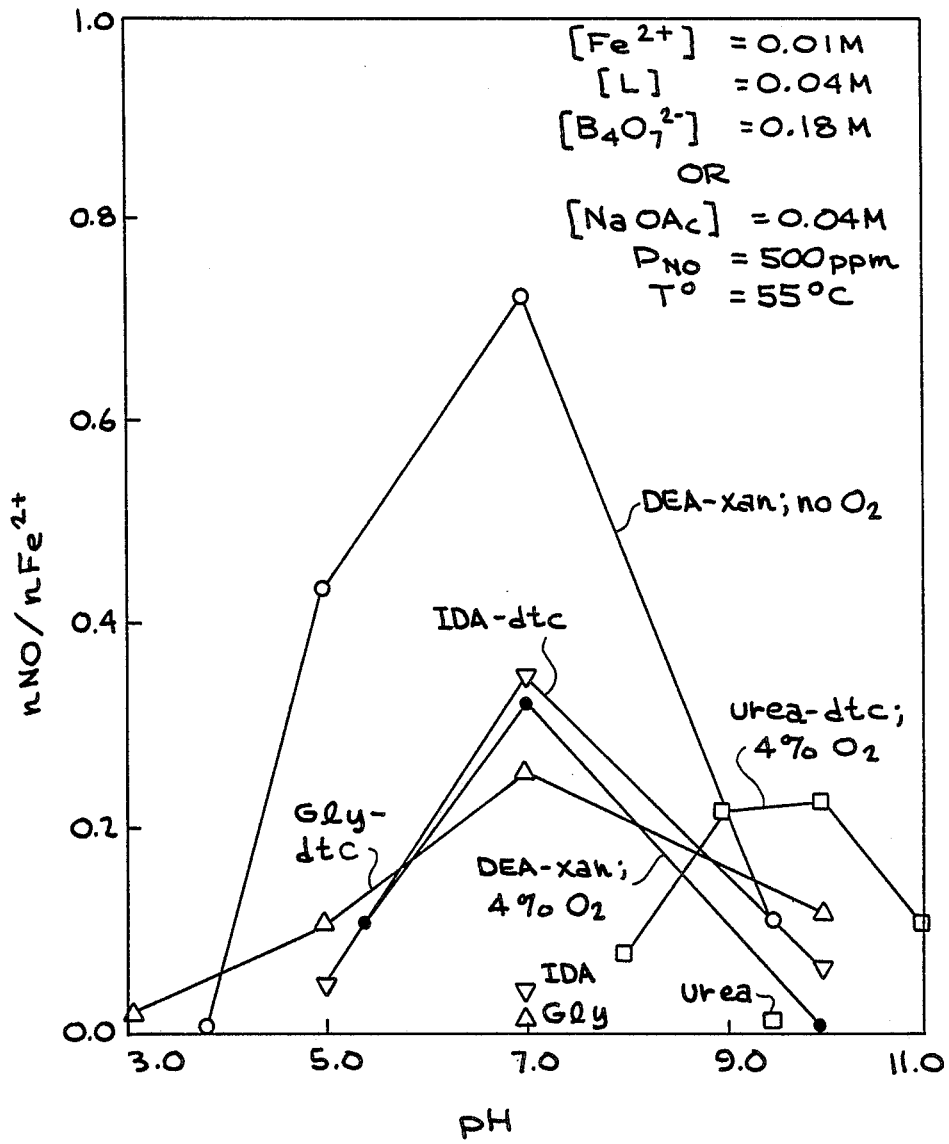
FIG. 3 is a diagram of the absorption capacity of various ferrous dithiocarbamates (dtc) and xanthates (xan) as a function of oxygen content and solution pH. The number of moles of NO absorbed per mole of $Fe^{2+}$ introduced ($nNO/nFe^{2+}$) is plotted on the vertical axis and pH is plotted on the horizontal axis.

The NO absorption capacity of several ferrous dtc's and xan's as a function of $O_2$ present and pH of the solution has been examined, and the results are shown in FIG. 3. It can be concluded that the ferrous dtc's and xan's can absorb NO much more efficiently compared to the corresponding underivatized starting amine or alcohol, and that $O_2$ is detrimental to NO absorption. These results have been discussed in detail hereinabove. As shown in FIG. 3, the pH of the absorbing solution is an important parameter for NO absorption capacity. In most cases examined, the dtc's and xan's perform best under neutral (pH about 7) conditions. These include Gly-dtc, IDA-dtc, and DEA-xan. The only exception seems to be urea-dtc, which has the highest NO absorption capacity between pH values of 9 and 10.

The iron ion can be introduced as either $Fe^{+2}$ or $Fe^{+3}$, preferably $Fe^{+2}$.

Usually, the nitrogen monoxide-containing gas is contacted with the aqueous solution at a temperature of between about 10° and 90° C.

Oxygen may be present in the gas in a concentration of between about 0.001 and 25 volume percent.

In one embodiment, the nitrogen monoxide-containing gas is contacted with the aqueous solution at a pH value of between 3 and 11.

In separate embodiments, the organic compound has a xanthate structure, or a thioxanthate structure, or a dithiocarbamate structure.

For each of the dithiocarbamate, the xanthate or the thioxanthate moieties described herein, in separate embodiments, the ionizable/polar organic moiety (R—) in this method comprises at least one ionizable/polar (organic) moiety having at least one polar functional group selected from —OH, —NH, —$NH_2$, —SH, —COOH, —$SO_3H$, heterocyclic —N—, heterocyclic —S—, or heterocyclic —O—, polymers or copolymers thereof or the organic or inorganic salts thereof. Further, these organic moieties are water-soluble.

Generally, the concentration of the organic compound-iron ion complex in the aqueous solution is between about 0.01 and 2 Molar, preferably between about 0.05 and 1.0 Molar.

In one embodiment, the ionizable/polar organic moiety is selected from amino acids, peptides, aminocarboxylic acids, aminosulfonic acids, primary amines, secondary amines, primary amides, alkyl substituted amides, cyclic substituted amines, aryl substituted amines, aliphatic alcohols, cyclic alcohols, aryl alcohols, alkyl and aryl thiols, cellulose, sugars, carbohydrates, polymers and copolymers thereof, mixtures of the aforementioned ionizable/polar organic moieties or the organic or ionorganic salts thereof.

The following Examples are to be interpreted as illustrative and exemplary only, and are not to be considered to be limiting in any way.

EXAMPLES 1-42

Removal of NO from a NO-containing Gas

The dithiocarbamates and xanthates used are prepared at room temperature by the following procedure. A 2.0M NaOH solution (100 ml) is purged with $N_2$ for 30 min in a 250 ml round bottom flask. The —$NH_2$, —NH, —SH or OH-containing compound is added such that its concentration is 0.8M, followed by dropwise addition of 4.8 ml (0.8M) of carbon disulfide ($CS_2$). The resultant mixture is stirred at room temperature until no more $CS_2$ globules are visible. The reaction time is generally less than 2 hr.

The NO absorption experiments were carried out using the bench-scale scrubbing system shown in FIG. 1. First, gaseous NO (from vessel 10) and $N_2$ (from vessel 11) are bubbled into an absorber (chamber 12) containing aqueous solutions of ferrous-polar organic compounds (chelates). Oxygen (vessel 13) is bubbled in or added as needed. The gases combine initially at point 14 of line 15 and are thoroughly mixed in gas mixer 16. The gas are transferred into the mixing zone (chamber 12 absorber) and exit in line 17 and are analyzed for NO content using analyzer (18).

All the reactions are performed at 55° C. according to the following procedure: 95 ml of a buffer solution, either borate ($[B_4O_7^{2-}]=0.18M$) for pH greater than 7, or acetate ([NaOAc]=0.40M) for pH less than 7, is purged with $N_2$ for 30 min in the reaction column. 5.0 ml of the above dithiocarbamate or xanthate solution is pipetted into the buffer solution, followed by the addition of 0.392 g (0.01M) $Fe(NH_4)_2(SO_4)_2 \cdot 6H_2O$. A gas mixture containing about 500 ppm NO, 0% or 4% $O_2$, and the balance $N_2$ is passed through the ferrous chelate solution at a flow rate of ~750 cc/min. The absorption of NO was monitored by a commercially available Thermoelectron Model 14A chemiluminescent $NO_x$ analyzer.

TABLE I

NO ABSORPTION EFFICIENCIES OF FERROUS DITHIOCARBAMATES[a]

| Example No. | Ligand | pH | $nNO/nFe^{2+}$ |
|---|---|---|---|
| 1 | — | 9.5 | 0.01* |
| 2 | sulfide[b] | 9.5 | 0.01* |
| 3 | IDA | 7.0 | 0.04 |
| 4 | IDA—dtc | 10.0 | 0.06 |
| 5 |  | 7.0 | 0.34 |
| 6 |  | 5.0 | 0.05 |
| 7 | Gly | 7.0 | 0.02 |
| 8 | Gly—dtc | 10.0 | 0.09 |
| 9 |  | 7.0 | 0.26 |
| 10 |  | 7.0 | 0.18[c] |
| 11 |  | 5.0 | 0.11 |
| 12 |  | 3.0 | 0.02 |
| 13 | CySH | 10.0 | 0.04 |
| 14 | CySH—dtc | 10.0 | 0.04 |
| 15 | GSH | 10.0 | 0.23 |
| 16 | GSH—dtc | 9.1 | 0.24 |
| 17 |  | 10.9 | 0.17 |
| 18 | urea | 10.0 | 0.01 |
| 19 | urea-dtc | 10.0 | 0.28[d] |
| 20 |  | 11.0 | 0.11 |
| 21 |  | 10.0 | 0.23 |
| 22 |  | 10.0 | 0.34[e] |
| 23 |  | 9.0 | 0.22 |
| 24 |  | 8.0 | 0.08 |
| 25 | AC | 9.2 | 0.01 |
| 26 | AC—dtc | 9.2 | 0.05 |
| 27 | DMU | 9.6 | 0.01 |
| 28 | DMU—dtc | 9.6 | 0.06 |
| 29 |  | 9.6 | 0.25[e] |
| 30 | TU | 9.5 | 0.01 |
| 31 | TU—dtc | 9.5 | 0.09 |

*Less than 0.01.
[a]Reaction conditions were: $[Fe^{2+}]$ = 0.01 M; [Ligand] = 0.04 M; $[B_4O_7^{2-}]$ = 0.18 M or [NaOAc] = 0.40 M; T° = 55° C.; PNO = 500 ppm; $^PO_2$ = 4%, unless otherwise noted.
[b]0.90 g FeS was used.
[c]$[Fe^{3+}]$ = 0.01 M; [Gly—dtc] = 0.05 M; $nNO/nFe^{3+}$ = 0.18.
[d]no $O_2$ was present in the gas mixture.
[e]another 0.04 M ligand was added to the reaction mixture after NO absorption was over.

TABLE 11

NO ABSORPTION EFFICIENCIES OF FERROUS XANTHATES[a]

| Example No. | Ligand | pH | nNO/nFe$^{2+}$ |
|---|---|---|---|
| 32 | DEA | 7.0 | 0.02 |
| 33 | DEA—xan | 9.5 | 0.12[b] |
| 34 |  | 7.0 | 0.73[b] |
| 35 |  | 5.0 | 0.44[b] |
| 36 |  | 10.0 | 0.01 |
| 37 |  | 7.0 | 0.33 |
| 38 |  | 5.4 | 0.11 |
| 39 | SA | 10.0 | 0.01 |
| 40 | SA—xan | 10.0 | 0.11 |
| 41 | sucrose | 9.6 | 0.01 |
| 42 | sucrose-xan | 9.6 | 0.03 |

[a]Reaction conditions were: [Fe$^{2+}$] = 0.01 M; [Ligand] = 0.04 M; [B$_4$O$_7{}^{2-}$] = 0.18 M or [NaOAc] = 0.40 M; T° = 55° C.; P$_{NO}$ = 500 ppm; P$_{O_2}$ = 4%, unless otherwise noted.
[b]no O$_2$ was present in the gas mixture.

While some embodiments of the present invention have been shown and described herein, it will be apparent to those skilled in the art that various modifications and changes can be made in the disclosed processes to remove NO from fluids or gases using organic xanthates, thioxanthates or dithiocarbamates of Fe (II) or Fe (III) without departing from the spirit and scope of the present invention. All such modifications and changes coming within the scope of the appended claims are intended to be covered thereby.

We claim:

1. A method of removal of nitrogen monoxide from a nitrogen monoxide-containing gas, which method comprises:

(a) contacting a nitrogen oxygen-containing gas with an aqueous solution of water soluble organic compound-iron ion complex of the formula:

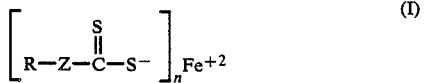

wherein the water-soluble organic compound is selected from compounds of the formula:

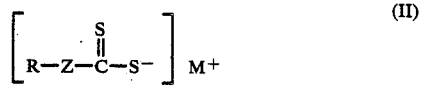

wherein:
R is selected from hydrogen or an organic moiety having at least one ionizable/polar functional group;
Z is selected from oxygen, sulfur, or —N—A wherein N is nitrogen and A is hydrogen or lower alkyl having from one to four carbon atoms; and
M is selected from hydrogen, sodium or potassium; and
n is 1 or 2, in a contacting zone for a time and at a temperature effective to reduce the nitrogen monoxide to nitrogen.

2. The method of claim 1 wherein the nitrogen monoxide-containing gas is contacted with the aqueous solution at a temperature of between about 10° and 90° C.

3. The method of claim 1 wherein oxygen is present in the gas in a concentration of between 0.001 and 25 volume percent.

4. The method of claim 1 wherein the nitrogen monoxide-containing gas is contacted with the aqueous solution at a pH value of between 3 and 11.

5. The method of claim 1 wherein Z is oxygen, and the organic compound has a xanthate structure.

6. The method of claim 1 wherein Z is sulfur and the organic compound has a thioxanthate structure.

7. The method of claim 1 wherein Z is N and A is hydrogen or a lower alkyl having from one to four carbon atoms, and the organic compound has a dithiocarbamate structure.

8. The method of claim 5 wherein the polar organic moiety (R) comprises at least one polar functional group selected from —OH, —NH, —NH$_2$, —SH, —COOH, —SO$_3$H, heterocyclic —N—, heterocyclic —S—, heterocyclic —O— or the organic or inorganic salts thereof.

9. The method of claim 6 wherein the polar organic moiety (R) comprises an organic group having at least one polar functional group selected from —OH, —NH, —NH$_2$, —SH, —COOH, —SO$_3$H, heterocyclic —N—, heterocyclic —S—, or heterocyclic —O—, or the organic or inorganic salts thereof.

10. The method of claim 7 wherein the polar organic moiety comprises at least one polar functional group selected from —OH, —NH, —NH$_2$, —SH, —COOH, —SO$_3$H, heterocyclic —N—, heterocyclic —S—, or heterocyclic —O—, or the organic or inorganic salts thereof.

11. The method of claim 1 wherein the concentration of the organic compound-iron ion complex in the aqueous solution is between about 0.01 and 2.0 Molar.

12. The method of claim 11 wherein the concentration is between about 0.05 and 1.0 Molar.

13. The method of claim 1 wherein the ionizable polar organic moiety is selected from amino acids, peptides, aminocarboxylic acids, aminosulfonic acids, primary amines, secondary amines, primary amides, alkyl substituted amides, cyclic substituted amines, aryl substituted amines, aliphatic alcohols, cyclic alcohols, aryl alcohols, alkyl thiols, aryl thiols, thiols, cellulose, sugar, carbohydrates, mixtures of the aforementioned polar organic moieties or the organic or inorganic salts thereof.

14. The method of claim 13 wherein the polar organic moiety is selected from an amino acid, a peptide having at least one alkyl urea, dialkylurea, thiourea, alkylthiourea, dialkylthiourea, cellulose, a sugar, a carbohydrate, alkanol, alkanol amine, phenol, substituted phenol, thiophenol, a substituted aniline, polymers of these polar functional groupings or the organic or inorganic salts thereof.

15. The method of claim 1 wherein the R and Z groups together have a molecular weight greater than 500 daltons.

16. The method of claim 1 wherein the contact time to absorb the nitrogen monoxide is between about 0.10 and 1 minute compound is selected from compounds wherein:
R is selected from hydrogen or an organic moiety having at least one polar functional group;
Z is selected from oxygen, sulfur or N—A wherein N is nitrogen and A is selected from hydrogen or lower alkyl having from one to four carbon atoms; and
n is 1 or 2.

17. The method of claim 1 wherein the iron introduced is selected from Fe(II) or Fe(III).

18. In a method for the removal of nitrogen monoxide from a nitrogen monoxide-containing gas using an organic-iron complex, wherein the improvement is the selection of a water-soluble organic compound-iron complex of the formula:

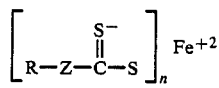

wherein:

R is selected from hydrogen or an organic moiety having at least one polar functional group;

Z is selected from oxygen, sulfur or N—A wherein N is nitrogen and A is selected from hydrogen or lower alkyl having from one to four carbon atoms; and n is 1 or 2, and reacting with NO in a contacting zone for a time and at a temperature effective to reduce the nitrogen monoxide to nitrogen.

19. The method of claim 17 wherein the polar organic moiety has a molecular weight of less than 500.

* * * * *